United States Patent Office.

THOMAS JONES, OF RAVENSWOOD, ILLINOIS.

FINISH FOR PLASTERED WALLS.

SPECIFICATION forming part of Letters Patent No. 383,397, dated May 22, 1888.

Application filed November 16, 1887. Serial No. 255,359. (No specimens.)

*To all whom it may concern:*

Be it known that I, THOMAS JONES, residing at Ravenswood, in the county of Cook and State of Illinois, have invented certain new and useful Improvements in Finish for Plastered Walls, of which the following is a specification.

The finish in general use in plastering walls, ceilings, &c., is commonly known as a "putty-coat," the chief ingredients of which are lime and plaster-of-paris. In the use of these materials many difficulties have been encountered. Among these difficulties the chief one was that the plaster-of-paris when added to the lime must be made soluble with water, and owing to its well-known quick-setting or hardening property it must be mixed with great haste and then quickly applied. Ordinarily the plasterer himself does the mixing, as the proportions of the plaster-of-paris and the lime must be accurately adjusted and each batch of the material must be alike. As it sets quite rapidly, only a small quantity can be mixed at a time, and the mixing must be performed many times in finishing even a small room. Often the condition of the wall is such that it will absorb the water of the finish, causing the latter to crack or chip before the workman can get around to trowel it. Then, again, the finish as now prepared sets on the trowels, hocks, and mortar-board, necessitating frequent cleaning.

One object of my invention is to treat the plaster-of-paris, or the gypsum from which it is obtained, so as to arrest this quick-setting property and enable its easy and convenient application, while the finish will ultimately become much harder than when compounded in the ordinary way. Another difficulty encountered in this finishing work is that the lime when slaked and allowed to cool becomes in a short time very hard and compact, so that it requires much labor to reduce it to the proper consistency to be mixed with the plaster. A further object of my invention is to so treat the lime intended for finishing material as that it shall remain in a soft or pasty condition, enabling the easy working of it at any length of time after slaking.

By the treatment to which I subject the gypsum and the lime I attain other beneficial results, which I will point out in connection with the description of said treatment hereinafter contained.

I may, as the first step in my improvements, employ a preliminary treatment of gypsum rock or uncalcined gypsum, which treatment consists in steeping such rock (which, for convenience, may be broken into pieces of, say, two to three pounds weight) in a solution of sulphuric acid—say ten parts of acid to one hundred parts of water—for a period of, say, ten days. The gypsum is then removed from the acid solution, dried, and reduced to a powder. To this gypsum powder I add pulverized potash alum, or its equivalents, in about the proportion of ten parts of alum to one hundred parts of gypsum, by weight, and thoroughly mix them. This compound I will designate as "gypsolite." It will form one ingredient of my improved finish. I then take another quantity of gypsum, treated, preferably, in the acid solution, substantially as above described, and calcine it in a suitable kiln at a dull-red heat for about an hour, which is usually sufficient to destroy its quick-setting properties. I then add for every one hundred pounds of this calcined gypsum two pounds of sulphate of potassa and two pounds of sulphate of alumina, and then grind the whole together until the mass is reduced to a fine powder. This compound I shall designate as "ceramite." This compound furnishes another ingredient for my improved finish. I then take fresh lime and thoroughly slake it. When thus slaked, it will be of the consistency of cream. As soon as the lime is thoroughly slaked and while it is yet hot, I add to it the first-described compound, which I have called "gypsolite," in about the proportions of five pounds of the latter to one hundred pounds of the former, and mix the two quickly and thoroughly. This mixture may then be allowed to stand until it is desired to use it. It will be of about the consistence of soft putty, and so remain. When it is desired to use it for a wall-finish, add to this last-named mixture the second-described compound, which I have called "ceramite," in about equal proportions, enough water being used to bring the mass to the proper consistency; but it may be found expedient to vary these proportions according to the nature of the work—as, for example, where a very strong finish is desired, as on the angles of walls, &c., more of the ceramite would be used.

This finish is much more easily worked than the ordinary putty-coat or hard-finish, as it trowels down smooth and glossy. Any quantity desired can be mixed at once, thus resulting in economy of time and insuring even and uniform work, and allowing the introduction of coloring-matter heretofore impracticable because of the impossibility of securing an even tint in the numerous mixtures. It will not set quickly, and therefore the tools of the workman do not require frequent cleaning; and when it finally sets it gives a very hard, even, glossy, smooth, and uniform surface.

The processes above described may be varied somewhat without departing from the spirit of my invention—as, for example, instead of using the mixture first described, the alum may be added to the lime when the latter is slaked, and a corresponding amount of gypsum added.

The preparatory treatment of the gypsum with sulphuric acid may be dispensed with and good results obtained, and hence I do not confine myself to this treatment.

I claim—

A finish for walls, consisting of lime, raw gypsum over calcined gypsum, and alum or its equivalents, in substantially the proportions stated.

THOMAS JONES.

Witnesses:
C. C. LINTHICUM,
E. K. LINTHICUM.